(12) United States Patent
Hendren et al.

(10) Patent No.: US 7,771,809 B2
(45) Date of Patent: *Aug. 10, 2010

(54) SHAPED HONEYCOMB

(75) Inventors: Gary Lee Hendren, Richmond, VA (US); Mikhail R. Levit, Glen Allen, VA (US); Subhotosh Khan, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 333 days.

This patent is subject to a terminal disclaimer.

(21) Appl. No.: 11/639,468

(22) Filed: Dec. 15, 2006

(65) Prior Publication Data

US 2008/0145597 A1   Jun. 19, 2008

(51) Int. Cl.
*B32B 3/12* (2006.01)

(52) U.S. Cl. ........................ 428/116; 428/118; 428/902; 428/34.2; 428/35.7; 162/157.1; 162/157.3

(58) Field of Classification Search ........................ None
See application file for complete search history.

(56) References Cited

U.S. PATENT DOCUMENTS

| | | | |
|---|---|---|---|
| 3,196,533 A * | 7/1965 | Ida et al. ........................ | 29/421.2 |
| 3,617,416 A * | 11/1971 | Kromrey ........................ | 156/173 |
| 3,756,908 A | 9/1973 | Gross | |
| 3,767,756 A | 10/1973 | Blades | |
| 3,869,429 A | 3/1975 | Blades | |
| 3,869,430 A | 3/1975 | Blades | |
| 4,698,267 A | 10/1987 | Tokarsky | |
| 4,729,921 A | 3/1988 | Tokarsky | |
| 5,026,456 A | 6/1991 | Hesler et al. | |
| 5,096,526 A | 3/1992 | Engwall | |
| 5,137,768 A | 8/1992 | Lin | |
| 5,217,556 A * | 6/1993 | Fell ........................ | 156/205 |
| 5,223,094 A | 6/1993 | Kirayoglu et al. | |
| 5,314,742 A | 5/1994 | Kirayoglu et al. | |
| 5,789,059 A | 8/1998 | Nomoto | |
| 6,186,766 B1 | 2/2001 | Davis et al. | |
| 6,458,244 B1 | 10/2002 | Wang et al. | |
| 6,544,622 B1 | 4/2003 | Nomoto | |
| 6,551,456 B2 | 4/2003 | Wang et al. | |
| 6,929,848 B2 | 8/2005 | Samuels et al. | |
| 2003/0082974 A1 | 5/2003 | Samuels et al. | |
| 2005/0085146 A1 * | 4/2005 | Farkas et al. ................ | 442/134 |

FOREIGN PATENT DOCUMENTS

EP   1 048 446 A2   11/2000

* cited by examiner

*Primary Examiner*—Ling Xu

(57) ABSTRACT

This invention relates to a honeycomb comprising cells having edges forming a face of the honeycomb, the face defined by a plurality of points and having an area of curvature wherein at least two of the points are located in different tangential planes, the walls of the cells comprising 5 to 50 parts by weight thermoplastic material having a melting point of from 120° C. to 350° C., and 50 to 95 parts by weight of a high modulus fiber having a modulus of 600 grams per denier (550 grams per dtex) or greater, based on the total amount of thermoplastic material and high modulus fiber in the walls; wherein less than 25 percent of the honeycomb cells in the area of curvature have a re-entrant angle of greater than 180 degrees. This invention also relates to articles including panels and/or aerodynamic structures comprising the honeycomb.

14 Claims, 9 Drawing Sheets

SHAPED HONEYCOMB

BACKGROUND OF THE INVENTION

1. Field of the Invention

This invention relates to honeycomb useful in high temperature environments that has been shaped such that the face of the honeycomb has an area of curvature that has at least two points that are located in different tangential planes. In a preferred embodiment this invention relates to honeycomb having a curved shape.

2. Description of Related Art

U.S. Pat. No. 5,096,526 discloses a process for forming a shaped structure from a high melt temperature thermoplastic laminate and a honeycomb core and particularly a process for bonding a thermoplastic laminate to a honeycomb core and subsequently shaping the structure on a molding tool. The process involves heating the laminate to more than 600° F. (315° C.) to bond the thermoplastic laminate coversheets to the honeycomb core without adhesives and then shaping the coversheets with the honeycomb core.

U.S. Pat. Nos. 5,137,768; 6,544,622; and 5,789,059 disclose honeycombs made from sheets made from high modulus para-aramid materials. These honeycombs are highly prized due to their high stiffness, high strength-to-weight ratio, and temperature resistance. The high modulus of the para-aramid materials can create very stiff honeycomb, which is desirable in many instances, but can create problems when trying to mold these honeycombs into curved shapes. When the honeycomb is shaped over or in a form having an area of curvature, one face of the honeycomb is put in tension and the other in compression. The side in compression generally suffers more damage and this damage is generally a recurving of cell walls; that is, a collapsing or bending of cell walls into the cell. If a large number of the cells have recurved cell walls the honeycomb has a serious structural defect.

Therefore what is needed is a honeycomb containing high modulus materials that also is able to withstand molding without damaging an excessive number of honeycomb cells.

BRIEF SUMMARY OF THE INVENTION

This invention relates to a honeycomb comprising cells having edges forming a face of the honeycomb, the face having defined by a plurality of points and having an area of curvature wherein at least two of the points are located in different tangential planes, the walls of the cells comprising 5 to 50 parts by weight thermoplastic material having a melting point of from 120° C. to 350° C., and 50 to 95 parts by weight of a high modulus fiber having a modulus of 600 grams per denier (550 grams per dtex) or greater, based on the total amount of thermoplastic material and high modulus fiber in the walls, wherein less than 25 percent of the honeycomb cells in the area of curvature have a re-entrant angle of greater than 180 degrees.

DETAILED DESCRIPTION OF THE INVENTION

Figure 1A:
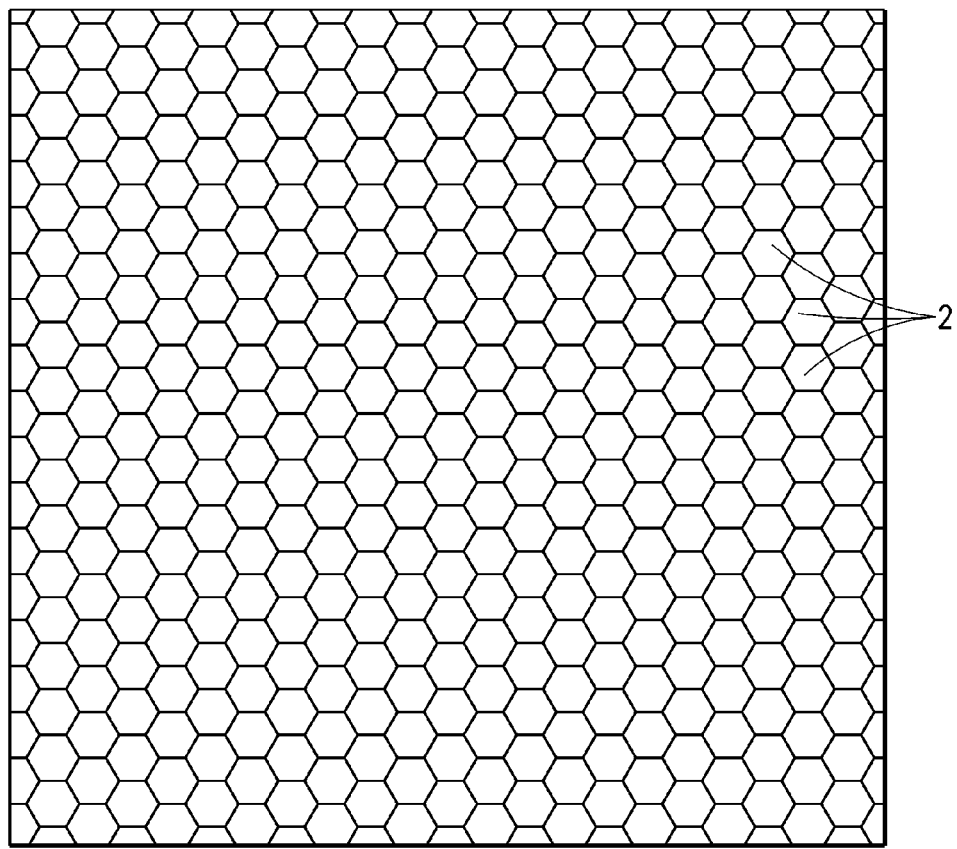
FIGS. 1a and 1b are representations of views of a hexagonal shaped honeycomb.
Figure 1B:
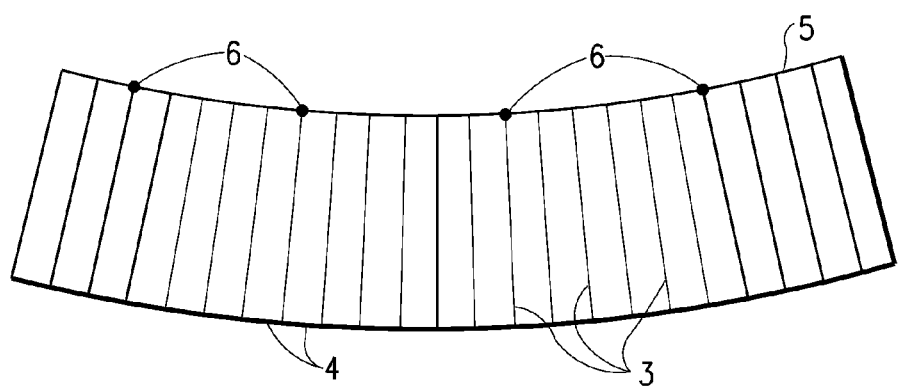
Figure 2:
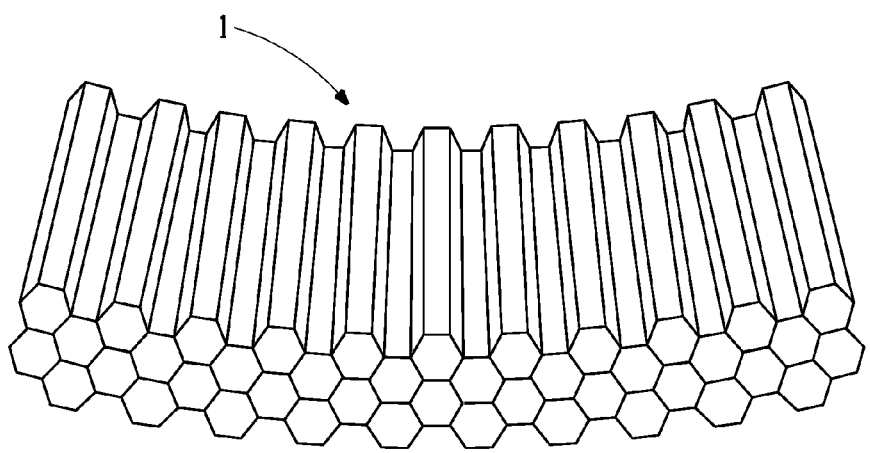
FIG. 2 is a representation of another view of a hexagonal cell shaped honeycomb.

The honeycomb comprises cells having edges forming a face of the honeycomb, the face defined by a plurality of points and having an area of curvature wherein at least two of the points are located in different tangential planes. FIG. 1a is one illustration of a honeycomb. FIG. 1b is an orthogonal view of the honeycomb shown in FIG. 1a and FIG. 2 is a three-dimensional view of the honeycomb. Shown is honeycomb 1 having hexagonal cells 2. Each cell is formed by a number of cell walls 3, and the outer edges of the cell walls 4 form the faces 5 of the honeycomb. In fact, the outer edges of the cell walls form a plurality of points 6 that lie in different tangential planes on the face of the honeycomb. Hexagonal cells are shown; however, other geometric arrangements are possible with rectangular cells being the other most common possible arrangement.

The honeycomb has a plurality of points on the face of the honeycomb located in different tangential planes, meaning the face of the honeycomb has a curvature or is bent in some manner. In some preferred embodiments the face of the honeycomb is curved in a parabolic form, a hyperbolic form, or some combination of curved forms. In other preferred embodiments the face of the honeycomb is curved in a hemispherical or bowl-shaped manner. In some embodiments the honeycomb can have a combination of an area without curvature and an area with curvature. In those embodiments, the area of curvature can be distinguished from the area without curvature by inspection. The area of curvature will have a face that in at least one surface dimension has a plurality of points in differing tangential planes; the area without curvature will have a face that has a plurality of points all in one plane. In some embodiments, the area with curvature has a radius of curvature as measured from the center of the thickness of honeycomb of 10 times the thickness of the honeycomb or less. In some embodiments the area of curvature has a radius of curvature as measured from the center of the thickness of honeycomb that is seven to two times the thickness of the honeycomb.

Figure 3A:
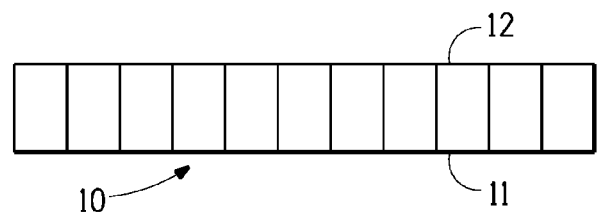
FIGS. 3a, 3b, and 3c is a representation of a simple process of forming a curved honeycomb.
Figure 3B:
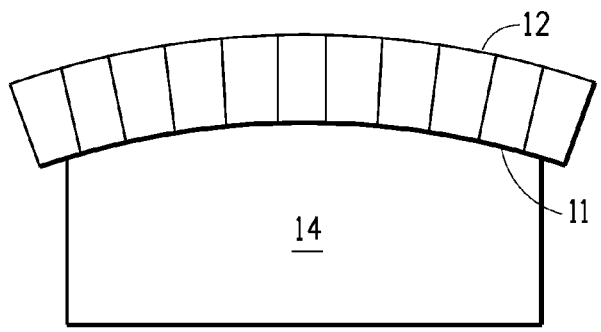
Figure 3C:
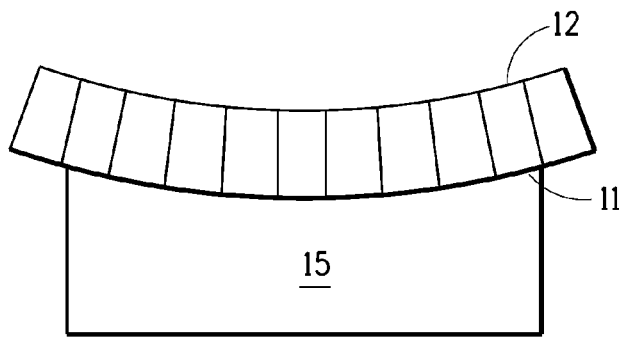
Figure 4A:
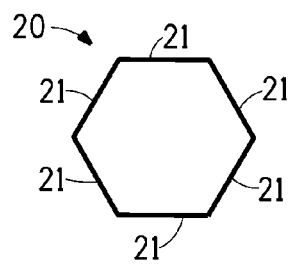
FIGS. 4a, 4b, 4c, and 4d illustrate undamaged hexagonal cells and damaged hexagonal cells having re-entrant cell walls.
Figure 4B:
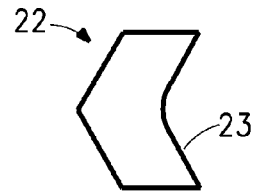
Figure 4C:
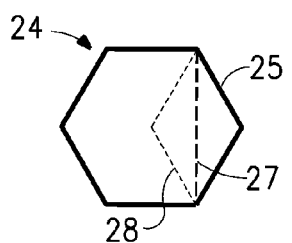
Figure 4D:
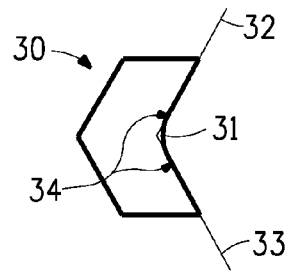
Figure 5A:
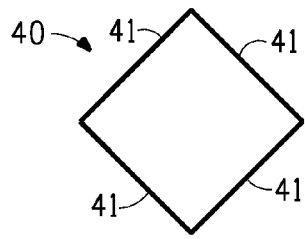
FIGS. 5a, 5b, 5c, and 5d illustrate undamaged square cells and damaged square cells having re-entrant cell walls.
Figure 5B:
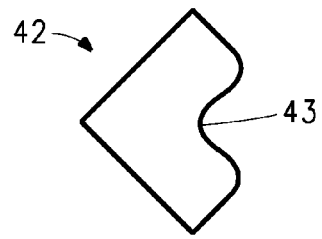
Figure 5C:
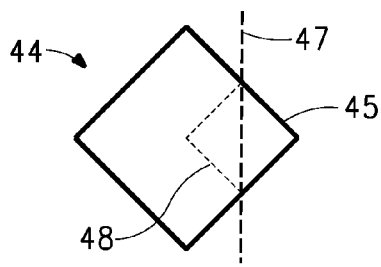
Figure 5D:
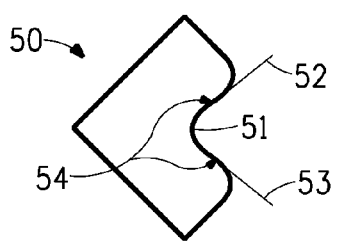

The formation of the curved honeycomb usually requires bending, molding, or forming the honeycomb over a form or in a mold having an area of curvature, or between male and female sections of a mold having an area of curvature. For illustration, FIG. 3 shows honeycomb 10 having a first face 11 and a second face 12 being formed over a curved form 14 having a convex surface; alternatively it shows honeycomb 10 being molded in a curved mold 15 having a concave surface. The first face 11 is in contact with the form and as the honeycomb is deformed from a flat plane to a curved structure over the convex form this face is put into compression. The opposite face 12 is likewise put into tension. Alternatively, face 11 is in contact with the concave mold and as the honeycomb is deformed from a flat plane to a curved structure this face is put in tension and face 12 is put in compression.

The act of putting one face of the honeycomb in compression can collapse cell walls at the honeycomb face. FIG. 4 illustrates an undamaged hexagonal cell 20 having six cell walls 21. Due to compression the hexagonal cell can collapse; damaged hexagonal cell 22 is shown with collapsed or recurved walls 23. The angle the collapsed walls make into the cell is called the re-entrant angle. Hexagonal cell 24 further illustrates by use of a solid line 25 the original position of the cell walls and illustrates by use of a dashed line 27 a representation of a 180 degree re-entrant angle. The dotted line 28 represents a re-entrant angle of greater than 180 degrees. The collapse of a cell wall may not be as distinct as represented in FIG. 4. The cell wall may invert in a manner the forms a curve into the cell as shown by hexagonal cell 22. In this case, the re-entrant angle is calculated based on tangents to the recurved walls. FIG. 4 shows honeycomb cell 30 having recurved cell wall 31 with tangents 32 and 33 drawn to show how the re-entrant angle 34 is measured. In the figure shown, the re-entrant angle is greater than 180 degrees. From the illustrations it can be readily appreciated that any substantial collapse of two adjacent cell walls into the center of cell will generally result in a re-entrant angle of greater than 180 degrees.

FIG. 5 illustrates an undamaged square cell 40 having four cell walls 41. Due to compression the square cell can collapse; damaged square cell 42 is shown with collapsed or recurved walls 43. Square cell 44 further illustrates by use of a solid line 45 the original position of the cell walls and illustrates by use of a dashed line 47 a representation of a 180 degree re-entrant angle. For a square cell, the dashed line 47 can be draw across the cell wall 41 at any point. The dotted line 48 represents a re-entrant angle of greater than 180 degrees. The collapse of a cell wall may not be as distinct as represented in FIG. 5. The cell wall may invert in a manner the forms a curve into the cell as shown by hexagonal cell 42. In this case, the re-entrant angle is calculated based on tangents to the recurved walls. FIG. 5 shows honeycomb cell 50 having recurved cell wall 51 with tangents 52 and 53 drawn to show how the re-entrant angle 54 is measured. In the figure shown, the re-entrant angle is greater than 180 degrees. From the illustrations it can be readily appreciated that any substantial collapse of two adjacent cell walls into the center of cell will generally result in a re-entrant angle of greater than 180 degrees. The number of cells having a re-entrant angle of greater than 180 degrees can be determined by inspection, or in the case of exceedingly small cells, other optical methods.

The honeycomb can be formed into a curved or bent shape without substantial collapse of the cells that are put into compression in the area of curvature. In fact, after forming, less than 25 percent of the honeycomb cells in the area of curvature have a re-entrant angle of greater than 180 degrees. In one preferred embodiment, less than 15 percent of the honeycomb cells in the area of curvature have and re-entrant angle of greater than 180 degrees. It is thought that the combination of a high modulus fiber and a sufficient portion of thermoplastic material in the cell walls provide a more pliable structure that can deform without substantial collapse of cells, while providing an ultimate honeycomb structure that has high stiffness and high temperature stability.

The cell walls of the honeycomb are preferably formed from a paper comprising a high modulus fiber and a thermoplastic material. As employed herein the term "paper" is employed in its normal meaning and it can be prepared using conventional paper-making processes and equipment.

The paper used in this invention can be formed on equipment of any scale from laboratory screens to commercial-sized papermaking machinery, such as Fourdrinier or inclined wire paper machines. A typical process involves making a dispersion of high modulus fibrous material such as floc and/or pulp and a binder material in an aqueous liquid, draining the liquid from the dispersion to yield a wet composition and drying the wet paper composition. The dispersion can be made either by dispersing the fibers and then adding the binder material or by dispersing the binder material and then adding the fibers. The dispersion can also be made by combining a dispersion of fibers with a dispersion of the binder material. If the binder material is a fiber, the binder fiber can be added to the dispersion by first making a mixture with high modulus fibers, or the binder fiber can be added separately to the dispersion. The concentration of fibers in the dispersion can range from 0.01 to 1.0 weight percent based on the total weight of the dispersion. The concentration of a binder material in the dispersion can be up to 50 weight percent based on the total weight of solids.

In a typical process, the aqueous liquid of the dispersion is generally water, but can include various other materials such as pH-adjusting materials, forming aids, surfactants, defoamers, and the like. The aqueous liquid is usually drained from the dispersion by conducting the dispersion onto a screen or other perforated support, retaining the dispersed solids and then passing the liquid to yield a wet paper composition. The wet composition, once formed on the support, is usually further dewatered by vacuum and/or other pressure forces and further dried by evaporating the remaining liquid.

In one preferred embodiment high modulus fibrous material and a thermoplastic binder, such as a mixture of short fibers or short fibers and binder particles, can be slurried together to form a mix that is converted to paper on a wire screen or belt. Reference is made to U.S. patent and patent application Nos. U.S. Pat. No. 3,756,908 to Gross; U.S. Pat. Nos. 4,698,267 and 4,729,921 to Tokarsky; U.S. Pat. No. 5,026,456 to Hesler et al.; U.S. Pat. No. 5,223,094 to Kirayoglu et al.; U.S. Pat. No. 5,314,742 to Kirayoglu et al.; U.S. Pat. Nos. 6,458,244 and 6,551,456 to Wang et al.; and U.S. Pat. No. 6,929,848 and 2003-0082974 to Samuels et al. for illustrative processes for forming papers from various types of fibrous material and binders.

Once the aramid paper is formed it is preferably hot calendered, with the high temperature and pressure from the rolls increasing the bond strength of the paper. This step increases the density and strength of the paper. Generally one or more layers of the paper are calendered in the nip between metal-metal, metal-composite, or composite-composite rolls. Alternatively, one or more layers of the paper can be compressed in a platen press at a pressure, temperature, and time that are optimal for a particular composition and final application. Calendering paper in this manner also decreases the porosity of the paper. The thickness of the paper used in this invention is dependent upon the end use or desired properties of the honeycomb and in some embodiments is typically from 1 to 5 mils thick. In some embodiments, the basis weight of the paper is from 0.5 to 6 ounces per square yard. Also, heat-treatment of the paper, such as radiant heat treatment, as an independent step before, after, or instead of calendering or compression, can be conducted if strengthening or some other property modification is desired without or in addition to densification.

The honeycomb comprises high modulus fibers having a tensile or Young's modulus of 600 grams per denier (550 grams per dtex) or greater. High modulus of the fiber provides necessary stiffness of the final honeycomb structure and corresponding panel. In the preferred embodiment, the Young's modulus of the fiber is 900 grams per denier (820 grams per dtex) or greater. In the preferred embodiment, the fiber tenacity is at least 21 grams per denier (19 grams per dtex) and its elongation is at least 2% so as to better survive the molding processing and provide higher level of mechanical properties to the final structure.

In a preferred embodiment the high modulus fiber is heat resistant fiber. By "heat resistant fiber" it is meant that the fiber preferably retains 90 percent of its fiber weight when heated in air to 500° C. at a rate of 20 degrees C. per minute. Such fiber is normally flame resistant, meaning the fiber or a fabric made from the fiber has a Limiting Oxygen Index (LOI) such that the fiber or fabric will not support a flame in air, the preferred LOI range being about 26 and higher.

The high modulus fibers can be in the form of a floc or a pulp or a mixture thereof. By "floc" is meant fibers having a length of 2 to 25 millimeters, preferably 3 to 7 millimeters and a diameter of 3 to 20 micrometers, preferably 5 to 14 micrometers. If the floc length is less than 3 millimeters, its impact on the paper strength is not high enough and if it is more than 25 millimeters, it is almost impossible to form a uniform web by a wet-laid method. If the floc diameter is less than 5 micrometers, it can be difficult to produce it with enough uniformity and reproducibility and if it is more than 20 micrometers, it is virtually impossible to form uniform paper of light to medium basis weights. Floc is generally made by cutting continuous spun filaments into specific-length pieces.

The term "pulp", as used herein, means particles of material having a stalk and fibrils extending generally therefrom, wherein the stalk is generally columnar and about 10 to 50 micrometers in diameter and the fibrils are fine, hair-like members generally attached to the stalk measuring only a fraction of a micrometer or a few micrometers in diameter and about 10 to 100 micrometers long.

In some embodiments, the high modulus fibers useful in this invention include fiber made from para-aramid, polybenzazole, or polypyridazole polymer or mixtures thereof. In some embodiments, the high modulus fibers useful in this invention include carbon fiber. In a preferred embodiment the high modulus fiber is made from aramid polymer, especially para-aramid polymer. In an especially preferred embodiment the high modulus fiber is poly(paraphenylene terephthalamide).

As employed herein the term aramid means a polyamide wherein at least 85% of the amide (—CONH—) linkages are attached directly to two aromatic rings. "Para-aramid" means the two rings or radicals are para oriented with respect to each other along the molecular chain. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. In some embodiments, the preferred para-aramid is poly (paraphenylene terephthalamide). Methods for making para-aramid fibers useful in this invention are generally disclosed in, for example, U.S. Pat. Nos. 3,869,430; 3,869,429; and 3,767,756. Such aromatic polyamide organic fibers, and various forms of these fibers are available from E. I. du Pont de Nemours and Company, Wilmington, Del. under the trademark Kevlar® fibers and from Teijin, Ltd., under the trademark Twaron®.

Commercially available polybenzazole fibers useful in this invention include Zylon® PBO-AS (Poly(p-phenylene-2,6-benzobisoxazole) fiber, Zylon® PBO-HM (Poly(p-phenylene-2,6-benzobisoxazole)) fiber, available from Toyobo, Japan. Commercially available carbon fibers useful in this invention include Tenax® fibers available from Toho Tenax America, Inc.

The honeycomb has 5 to 50 parts by weight thermoplastic material having a melting point of from 120° to 350° Celsius. In some preferred embodiments, the thermoplastic material is present in an amount that is from 20 to 40 parts by weight. Thermoplastic is meant to have its traditional polymer definition; that is, these materials flow in the manner of a viscous liquid when heated and solidify when cooled and do so reversibly time and time again on subsequent heatings and coolings.

In some other preferred embodiments the melting point of the thermoplastic is from 180° to 300° C. In some other preferred embodiments the melting point of the thermoplastic is 220° to 250° C. While papers can be made with thermoplastic material having a melt point lower than 120° C., this paper can be susceptible to undesirable melt flow, sticking, and other problems after paper manufacture. For example, during honeycomb manufacture, after node line adhesive is applied to the paper, generally heat is applied to remove solvent from the adhesive. In another step, the sheets of paper are pressed together to adhere the sheets at the node lines. During either of these steps, if the paper has a low melt point thermoplastic material, that material can flow and undesirably adhere the paper sheets to manufacturing equipment and/or other sheets. Therefore, preferably the thermoplastic materials used in the papers can melt or flow during the formation and calendering of the paper, but do not appreciably melt or flow during the manufacture of honeycomb. Thermoplastic materials having a melt point above 350° C. are undesired because they require such high temperatures to soften that other components in the paper may begin to degrade during paper manufacture. In those embodiments where more than one type of thermoplastic material is present then at least 30% of the thermoplastic material should have melting point not above 350° C.

In some embodiments the glass transition temperature (Tg) of the thermoplastic is from about 100° to 250° C. Thermoplastics having a Tg of less that 100° C. can in some instances adversely affect the efficient expansion of the honeycomb cells during manufacture; thermoplastics having a Tg of greater than 250° C. can in some instances affect the final molding of the honeycomb.

Thermoplastic material useful in this invention can be in the form of fibers, bicomponent fibers, polymer flakes, polymer particles, fibrids, pulp or mixtures thereof. Binder fibers are typically made from a thermoplastic material that flows at a temperature that is lower (i.e., has a softening point lower) than the softening point of any of the other fibers in the fiber blend. Sheath/core bicomponent fibers are preferred as binder fibers, especially bicomponent binder fibers having a core of polyester homopolymer and a sheath of copolyester that is a binder material, such as are commonly available from Unitika Co., Japan (e.g., sold under the trademark MELTY®). Useful types of binder fibers can include those made from polypropylene, polyester polymers or copolymers, the fibers containing only that polymer or copolymer, or as a bicomponent fiber in side-by-side or sheath/core configuration. In some embodiments a preferred binder powder is a thermoplastic binder powder such as copolyester Griltex EMS 6E adhesive powder. The term "fibrids" as used herein, means a very finely-divided polymer product of small, filmy, essentially twodimensional particles having a length and width on the order of 100 to 1000 micrometers and a thickness only on the order of 0.1 to 1 micrometer. Fibrids are typically made by streaming a polymer solution into a coagulating bath of liquid that is immiscible with the solvent of the solution. The stream of polymer solution is subjected to strenuous shearing forces and turbulence as the polymer is coagulated.

In some embodiments, the preferred thermoplastic materials used in the paper are polyethylene terephthalate (PET) and/or polyethylene naphthalate (PEN) polymers. These polymers may include a variety of comonomers, including diethylene glycol, cyclohexanedimethanol, poly(ethylene glycol), glutaric acid, azelaic acid, sebacic acid, isophthalic acid, and the like. In addition to these comonomers, branching agents like trimesic acid, pyromellitic acid, trimethylolpropane and trimethyloloethane, and pentaerythritol may be used. The PET may be obtained by known polymerization techniques from either terephthalic acid or its lower alkyl esters (e.g. dimethyl terephthalate) and ethylene glycol or blends or mixtures of these. PEN may be obtained by known polymerization techniques from 2,6-naphthalene dicarboxylic acid and ethylene glycol. One useful PEN fiber is sold under the tradename Teonex® by Teijin, Ltd.

In other embodiments, the preferred thermoplastic materials used are liquid crystalline polyesters. By a "liquid crystalline polyester" (LCP) herein is meant a polyester polymer that is anisotropic when tested using the TOT test or any reasonable variation thereof, as described in U.S. Pat. No. 4,118,372, which is hereby included by reference. One preferred form of LCP is "all aromatic", that is all of the groups in the polymer main chain are aromatic (except for the linking groups such as ester groups), but side groups that are not aromatic may be present. Preferably the melting point of the LCP is up to about 350° C. In the case of a sheath-core bicomponent fiber, in which the sheath polymer is the binder or low meltable component, this sheath polymer should have a melting point below or up to about 350° C., while the core component can be a polymer having a higher melt point. Melting points are measured by ASTM Method D3418. Melting points are taken as the maximum of the melting endotherm, and are measured on the second heat at a heating rate of 10° C./min. If more than one melting point is present the melting point of the polymer is taken as the highest of the melting points. A preferred LCP for this invention include corresponding grades of Zenite® available from DuPont Co, and Vectra® LCP available from Ticona Co.

Other materials, particularly those often found in or made for use in thermoplastic compositions may also be present in the thermoplastic material. These materials should preferably be chemically inert and reasonably thermally stable under the operating environment of the honeycomb. Such materials may include, for example, one or more of fillers, reinforcing agents, pigments and nucleating agents. Other polymers may also be present, thus forming polymer blends. In some embodiments, other polymers are present it is preferred that they are less than 25 weight percent of the composition. In another preferred embodiment, other polymers are not present in the thermoplastic material except for a small total amount (less than 5 weight percent) of polymers such as those that function as lubricants and processing aids.

The honeycomb is useful as a structural component in many articles, including overhead storage bins and wing-to-body fairings on commercial airliners. Due to the lightweight structural properties of honeycomb, one preferred use is in aerodynamic structures wherein lighter weights allow savings in fuel or the power required to propel an object through the air.

Figure 6:
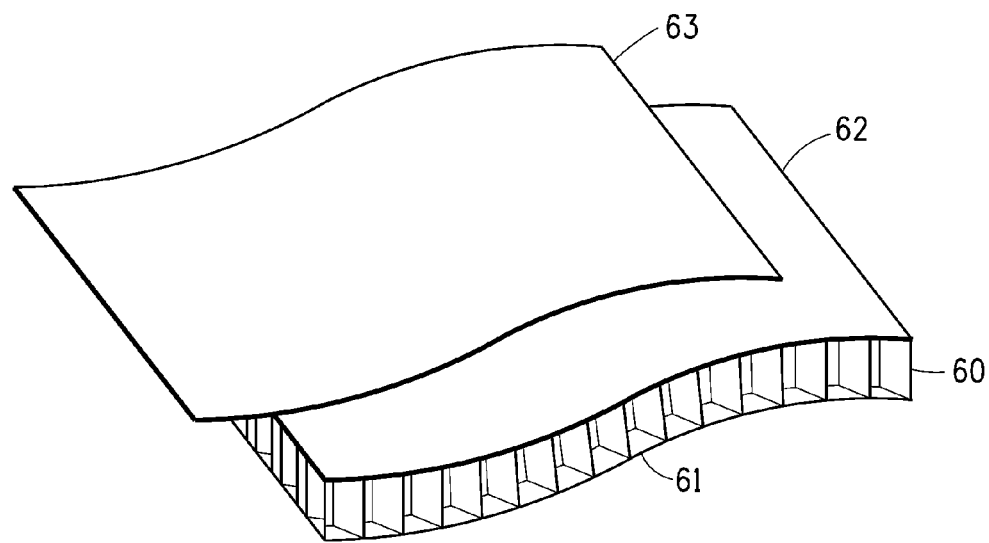
FIG. 6 is an illustration of one shaped article in the form of a panel made from honeycomb and one or more facesheets.

One or more facesheets may be attached to the face of the honeycomb to form a panel. Facesheets provide integrity to the final panel in its resistance to compression, bending, and other stresses. Also, facesheets can seal the cells of the honeycomb to prevent material from the cells, or the facesheets can help retain material in the cells. FIG. 6 shows honeycomb 60 having a facesheet 61 attached to one face by use of an adhesive. A second facesheet 62 is attached to the opposing face of the honeycomb, and the honeycomb with the two opposing facesheets attached form a panel. Additional layers of material 63 can be attached to either side of the panel as desired. In some preferred embodiments face sheets applied to both sides of the honeycomb contain two layers of material. In some preferred embodiments, the facesheet comprises a woven fabric or a crossplied unidirectional fabric. In some embodiments crossplied unidirectional fabric is a 0/90 crossply. If desired, the facesheet can have a decorative surface, such as embossing or other treatment to form an outer surface that is pleasing to the eye. Fabrics containing glass fiber, carbon fiber, and/or other high strength/high modulus fibers are useful as facesheet material.

One process of making a honeycomb comprising cells having edges forming a face of the honeycomb, the face defined by a plurality of points and having an area of curvature wherein at least two of the points are located in different tangential planes, comprises the steps of:

a) bonding a plurality of sheets along parallel lines of adhesive, the sheets comprising 5 to 50 parts by weight thermoplastic material having a melting point of from 120° to 350° C., and 50 to 95 parts by weight high modulus fiber having a modulus of 600 grams per denier (550 grams per dtex) or greater, based on the total amount of thermoplastic material and high modulus fiber in the walls;

b) pulling the bonded sheets apart in directions perpendicular to the plane of the sheets to form a honeycomb having cells;

c) heating the honeycomb to soften the thermoplastic material;

d) bending, molding, or forming the honeycomb in a mold or over a form having an area of curvature; and e) cooling the honeycomb to retain the shape of the area of curvature of the mold or form.

Figure 7:
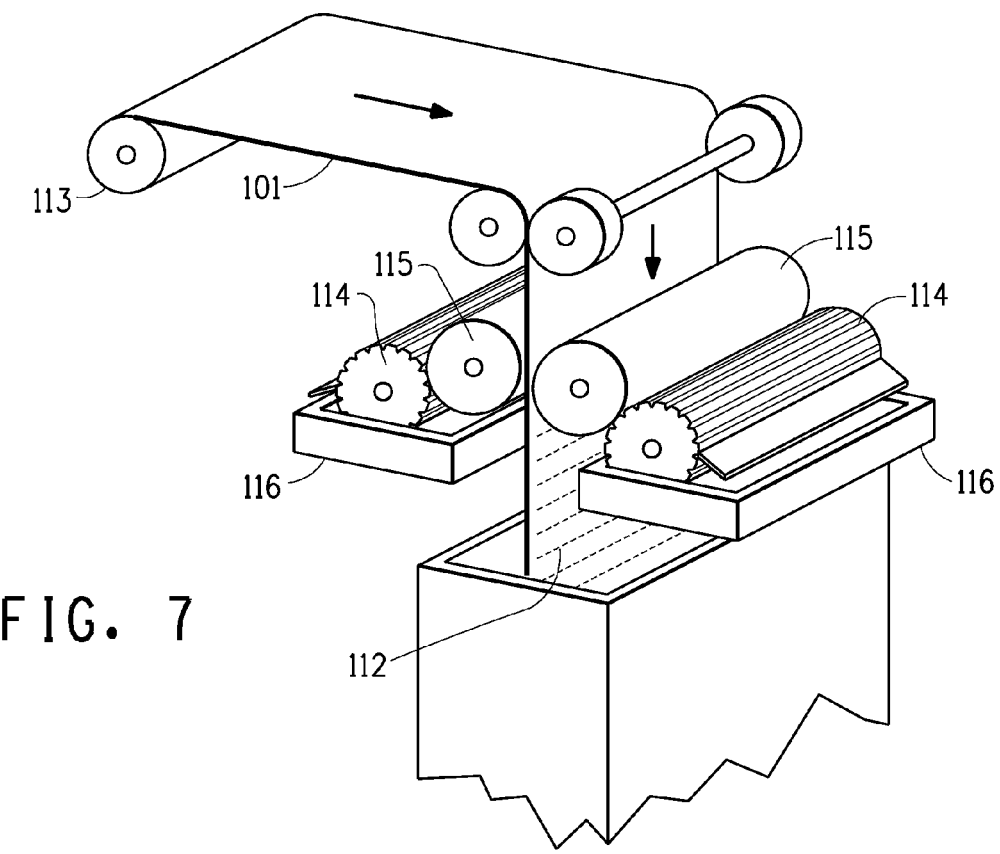
FIG. 7 is a view of a process step for applying adhesive in the manufacture of honeycomb.
Figure 8:
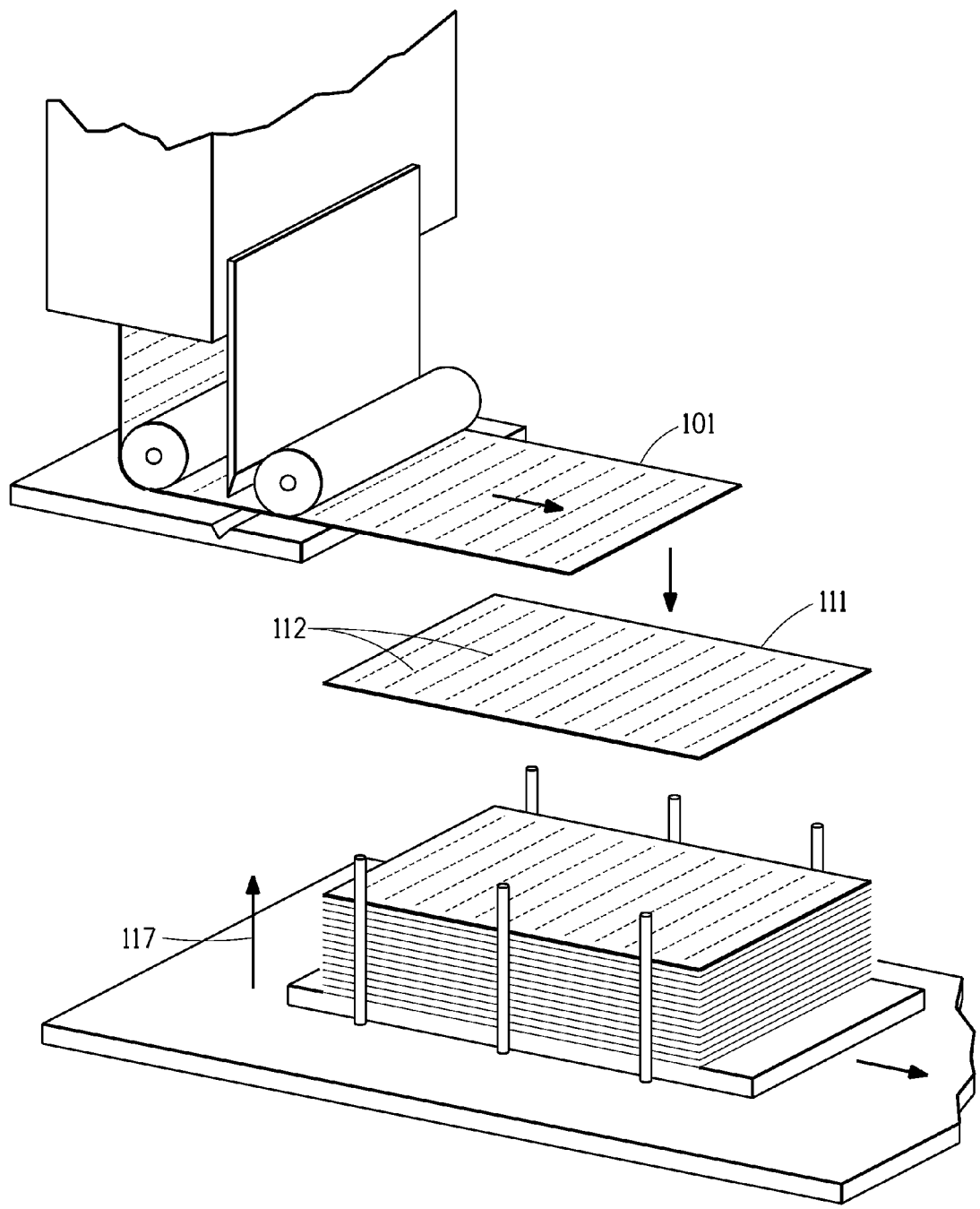
FIG. 8 is a view of a process step for stacking sheets of fiber-containing paper in the manufacturing of honeycomb.
Figure 9:
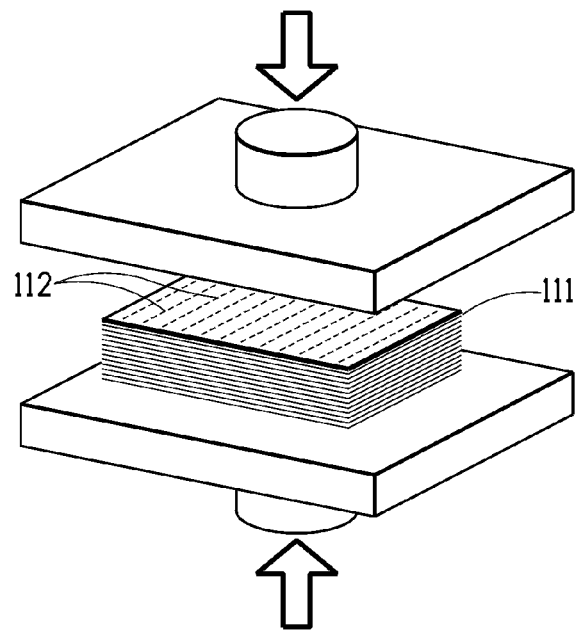
FIG. 9 is a view of a process step for hot-pressing a stack of sheets of paper in the manufacturing of honeycomb.

FIGS. 7 to 9 illustrate one embodiment of the step of bonding a plurality of sheets along parallel lines that are spaced apart. For typical hexagonal cells, the distance between the trailing edge of one applied node line to the leading edge of the next applied node line on any one sheet is equal to three times one cell wall length. In FIG. 7, the adhesive 112 is applied along a number of lines at a certain width and a pitch to a belt of the high modulus fiber-containing paper 101 by any applying method or printing method. The adhesive may be a resin selected from epoxy resins, phenolic resins, acrylic resins, polyimide resins and other resins, however, it is preferred that a thermoset resin be used. In the figure, a belt-like high modulus fiber-containing paper 101 from a reel 113 is fed into the nip of at least one set of rollers comprising an applying roller 114 and a pressing roller 115. Through the grooves provided on the applying roller 114, the adhesive 112 contained in an adhesive tank 116 is applied or coated along a number of lines to one surface of the paper 101 and is then dried.

In FIG. 8, the belt-like high modulus fiber-containing paper 101 is cut at a predetermined interval to a plurality of sheets 111. The cut sheets are stacked one on top of the other, such that each of the sheets is shifted to the other by half a pitch or a half the interval of the applied adhesive 112. For a typical example, 400 cut sheets can be stacked vertically, as shown by an arrow 117, to form a block, in such a positional relationship that each of the sheets is shifted by half the interval of the lines of the coated adhesive.

In FIG. 9 each of the stacked high modulus fiber-containing paper sheets 111 are bonded to each other by pressure and heat. In a preferred embodiment a number of stacked high modulus fiber-containing paper sheets are then hot-pressed at the softening point of the adhesive 112. The adhesive is then allowed to harden to bond the sheets with each other.

Figure 10A:
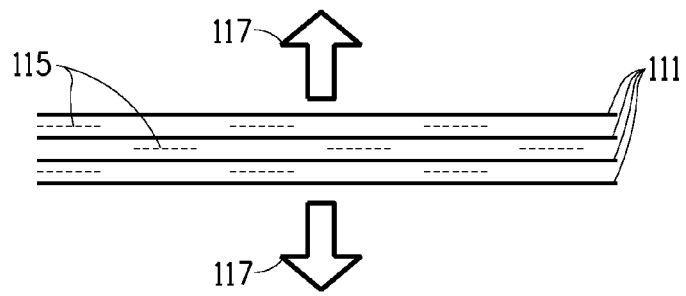
FIG. 10 is a view of a process step for expanding a stack of sheets of paper in the manufacturing of honeycomb.
Figure 10B:
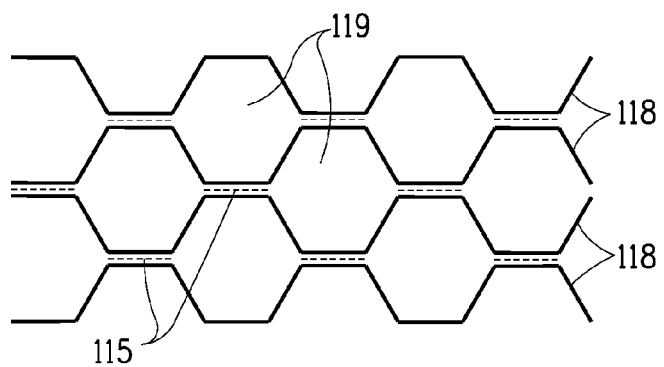

FIGS. 10a and 10b illustrate the step of pulling the bonded sheets apart in directions perpendicular to the plane of the sheets to form a honeycomb having cells. This also can be referred to as the expanding step. The stacked and bonded high modulus fiber-containing paper sheets 111 are expanded in the direction counter to the stacking direction by a tensile force or tension applied in the direction shown by arrows 117. Each of the sheets 111 are thereby expanded or extended between them such that the sheets are folded along the edges of the bonded portions and the portions not bonded are extended in the direction counter to the stacking direction, to separate the sheets from each other. Consequently, there are formed honeycomb cells composed of a planar assembly of hollow, columnar cells 119 separated by cell walls 118 made of sheets 111 that were bonded to each other along a number of adhesive node lines 115 and were expanded.

The next step in this process for making the honeycomb is heating the honeycomb to soften the thermoplastic material in the cell walls of the honeycomb. This can be done by any available means of providing a heat source, such as radiant heating, forced-air heated ovens, and dielectric ovens, and the like; however, in some preferred embodiments radiant heating is preferred. The heating is conducted at a temperature and for a time to sufficiently soften the thermoplastic material in the cell walls; generally the temperature will be close to or above the melting point of the thermoplastic material and the time required will be dictated by the mass of material present. In some embodiments the preferred heating temperature is +/−10 degrees Celsius of the thermoplastic melt temperature. If desired, the heat source and the mold or form may be combined so that the honeycomb can be heated and formed without intervening handling of the heated honeycomb.

Figure 11A:
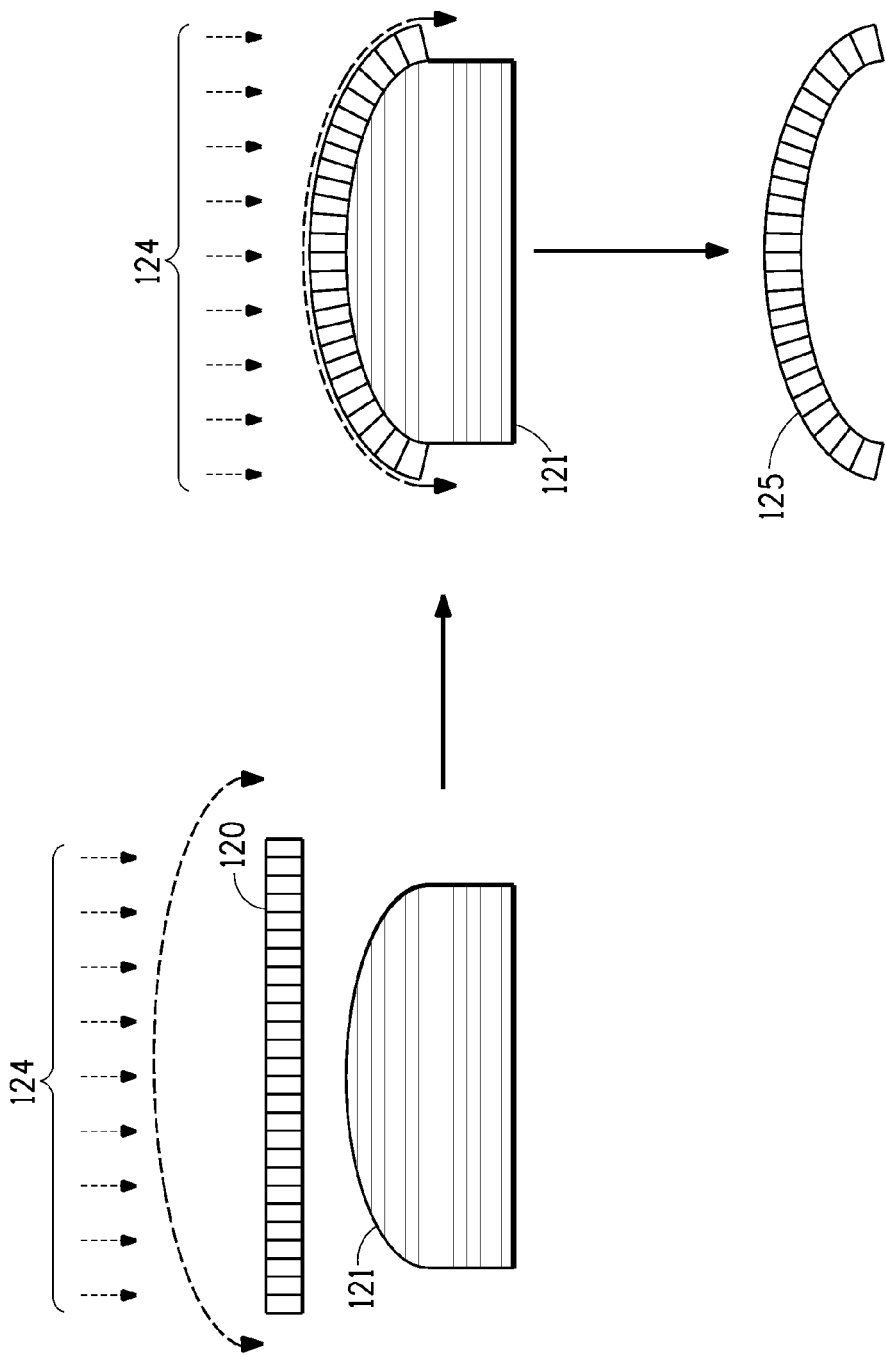
FIGS. 11a and 11b are views of example process steps for shaping honeycomb.
Figure 11B:
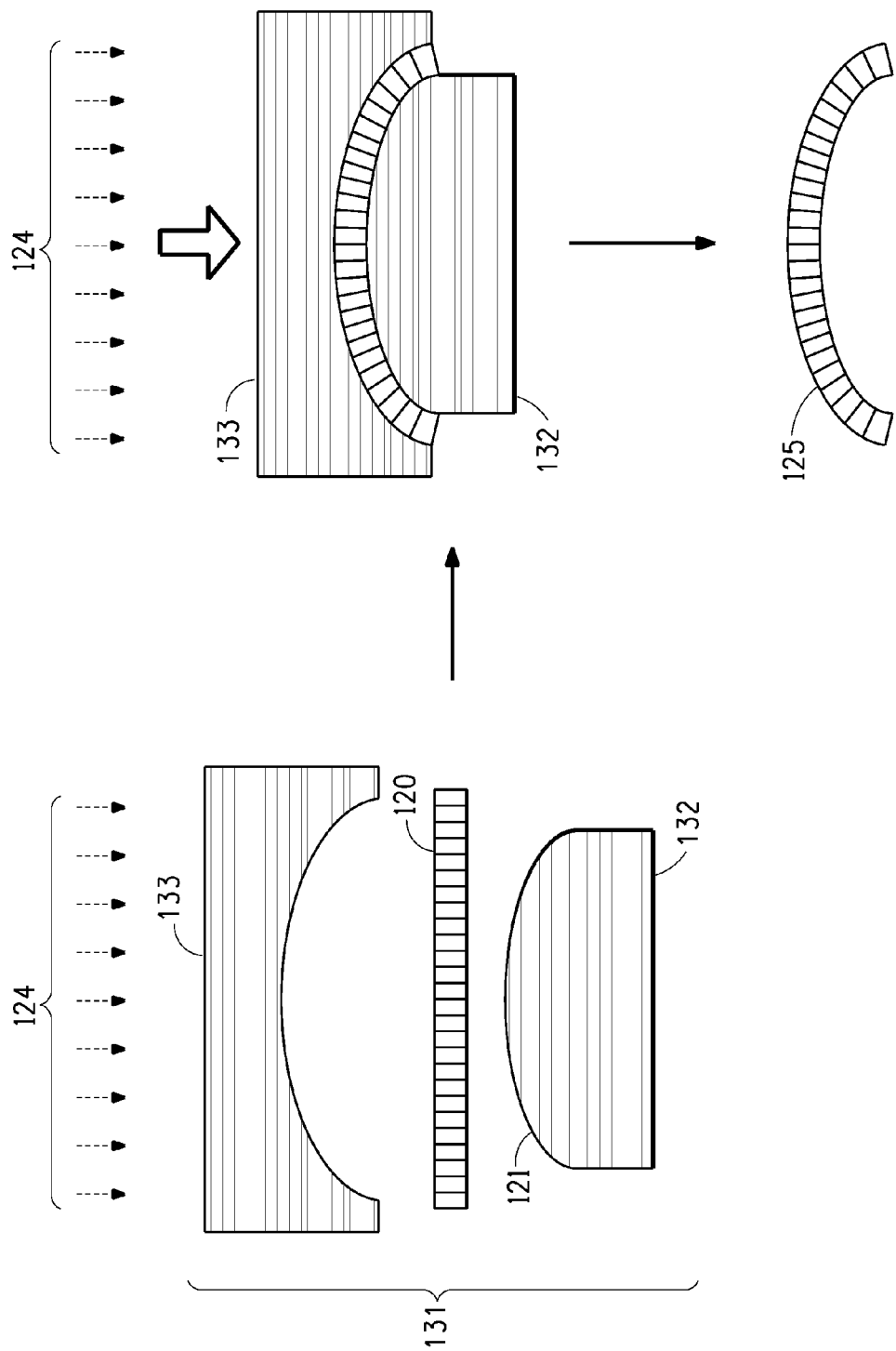

The honeycomb is then shaped by bending, molding, or forming the heated honeycomb in a mold or over a form having an area of curvature. As illustrated in FIG. 11a, heat 124 is applied to honeycomb 120 disposed onto a molding form 121 having the shape of the article desired. The honeycomb is then pressed on the form by any available means to have the honeycomb assume the curved or bent surface 125 of the form. In some embodiments, as shown in FIG. 11b, the form will be a molding tool 131 having male 132 and female 133 halves that are pressed together to mold and form the curved honeycomb 125 therebetween; conforming the honeycomb to the desired shape represented by the molding tool. The molding tool or form may be temperature controlled, providing either additional heating or cooling to the honeycomb.

The heated and shaped honeycomb is then cooled below the softening temperature of the thermoplastic to set and retain the shape of the area of curvature of the mold or form. This cooling can be accomplished by passive cooling, such as free convection; or by active cooling, such as by cooling the mold with some cooling agent such as air, water or other fluid. Generally the cooling will be accomplished while the honeycomb is retained in the mold or is disposed over a form. If desired, the honeycomb may be removed from the mold or form and cooled separately. If the honeycomb is removed from the mold without cooling steps may need to be taken to ensure the honeycomb retains an adequate representation of the desired shape of the area of curvature. In a preferred embodiment, after the cooling step, less than about 25 percent of the honeycomb cells in the area of curvature of the honeycomb have a re-entrant angle of greater than 180 degrees. The process can further comprise the step of impregnating the honeycomb with a resin, preferably a thermoset resin.

The use of substantial amount of thermoplastic material in the cell walls of the honeycomb allows the formation of these curved or bent shapes without excessive damage or collapse of the honeycomb cells on the side of the honeycomb that is put in compression during shaping.

Another process of making a honeycomb comprising cells having edges forming a face of the honeycomb, the face defined by a plurality of points and having an area of curvature wherein at least two of the points are located in different tangential planes, comprises the steps of:

a) bonding a plurality of sheets along parallel lines of adhesive, the sheets comprising 5 to 50 parts by weight thermoplastic material having a melting point of from 120° to 350° C. and 50 to 95 parts by weight high modulus fiber having a modulus of 600 grams per denier (550 grams per dtex) or greater, based on the total amount of thermoplastic material and high modulus fiber in the walls;

b) pulling the bonded sheets apart in directions perpendicular to the plane of the sheets to form a honeycomb having cells;

c) impregnating the honeycomb with a thermoset resin;

d) heating the honeycomb to cure the thermoset resin;

e) cutting the honeycomb into slices;

f) heating the honeycomb slices to a temperature above the point that both the thermoset resin and the thermoplastic material soften;

g) bending, molding, or forming the honeycomb slices in a mold or over a form having an area of curvature; and h) cooling the honeycomb slices to substantially retain the shape of the area of curvature of the mold or form.

In this embodiment of a process for forming a honeycomb, the honeycomb is impregnated with a thermoset resin after it is expanded. Typically this is accomplished by dipping the expanded honeycomb made after step b) into a bath of thermoset resin, however, other means such as sprays could be employed to coat and fully impregnate the expanded honeycomb. In some embodiments the thermoset resins useful as impregnants include epoxy resins, phenolic resins, acrylic resins, polyimide resins, and mixtures thereof.

After the honeycomb is fully impregnated with thermoset resin, the resin is then cured by heating the saturated honeycomb to crosslink the thermoset resin. Generally this temperature is in the range of 150° to 180° C. Curing the thermoset resin provides stiffness to the honeycomb. The cured honeycomb is then cut into slices. In this way, multiple thin sections or slices of honeycomb can be obtained from a large block of honeycomb. The honeycomb is sliced perpendicular to the plane of the cell edges so that the cellular nature of the honeycomb is preserved.

The slices are then heated and molded or formed and then cooled as in the previous process. Although the honeycomb has a cured thermoset resin, the addition of heat not only softens the thermoplastic material in the cell walls, but can also plasticize the thermoset resin in the walls. The softening and plasticizing of the cell wall material assists the formation of curved or bent shapes without excessive damage or collapse of the honeycomb cells on the side of the honeycomb that is put in compression during shaping. If desired, the slices can be dipped in heat water; likewise the slices can be dipped in water before heating and molding or forming. In some resin systems this will further plasticize some resins, for example some phenolic resins, for even better shaping. In a preferred embodiment, after the cooling step less than about 25 percent of the honeycomb cells in the area of curvature of the honeycomb have having a re-entrant angle of greater than 180 degrees.

Another process of making a honeycomb comprising cells having edges forming a face of the honeycomb, the face defined by a plurality of points and having an area of curvature wherein at least two of the points are located in different tangential planes, comprises the steps of:
a) bonding a plurality of sheets along parallel lines of adhesive, the sheets comprising 5 to 50 parts by weight thermoplastic material having a melting point of from 120° to 350° C. and 50 to 95 parts by weight high modulus fiber having a modulus of 600 grams per denier (550 grams per dtex) or greater, based on the total amount of thermoplastic material and high modulus fiber in the walls;
b) pulling the bonded sheets apart in directions perpendicular to the plane of the sheets to form a honeycomb having cells;
c) impregnating the honeycomb with a thermoset resin;
d) heating the honeycomb to B-stage or partially cure the thermoset resin;
e) cutting the honeycomb into slices;
f) heating a honeycomb slice to a temperature above the point that both the thermoset resin and the thermoplastic material soften;
g) bending, molding, or forming the honeycomb slice in a mold or over a form having an area of curvature;
h) holding the honeycomb slice in the mold or over a form for a time and temperature sufficient to cure the thermoset resin; and
i) cooling the honeycomb to substantially retain the shape of the area of curvature of the mold or form.

In this process, the expanded honeycomb is again impregnated with a thermoset resin, but in this embodiment the thermoset resin is only partially cured, or as referred to in the art, "B-staged". "B-staged" is normally used to refer to an intermediate stage in the reaction of certain thermosetting polymers wherein the material can still be softened when heated or swelled in contact with certain liquids but cannot be completely fused or dissolved; B-staged resins generally permit some degree of formability or shaping into certain specific configurations.

In a similar manner as in the previous process, the B-stage honeycomb is then cut into slices so that the cellular nature of the honeycomb is preserved. The slices are then heated and molded or formed and then cooled as in the previous process; however, in this process the heating serves both the purpose of softening the thermoplastic material while also curing the thermoset resin. As before, the addition of heat adequately softens the thermoplastic material to provide some elongation of the walls during molding to allow the formation of these curved or bent shapes without excessive damage or collapse of the honeycomb cells in the area of curvature on the side of the honeycomb that is put in compression during shaping. In a preferred embodiment, after the cooling step less than about 25 percent of the honeycomb cells in the area of curvature of honeycomb have a re-entrant angle of greater than 180 degrees.

Another process of making a honeycomb comprising cells having edges forming a face of the honeycomb, the face defined by a plurality of points and having an area of curvature wherein at least two of the points are located in different tangential planes, comprises the steps of:
a) forming a honeycomb having cells from a plurality of sheets, the sheets having a plurality of parallel lines of adhesive in a plurality of parallel planes, the sheets comprising thermoplastic material having a melting point of from 120° to 350° C. and high modulus fiber having a modulus of 600 grams per denier (550 grams per dtex) or greater;
b) impregnating the honeycomb with a thermoset resin;
c) curing or partially curing the thermoset resin to form a cured or partially cured honeycomb;
d) pressing the cured or partially cured honeycomb in a direction perpendicular to a plane of parallel lines of adhesive to fracture at least a portion of the thermoset resin;
e) pulling the pressed honeycomb apart in a direction perpendicular to a plane of parallel lines of adhesive to form a honeycomb having fracture points;
f) bending, molding, or forming the honeycomb having fracture points in a mold or over a form having an area of curvature;
g) heating the honeycomb to allow the thermoplastic material to flow to the fracture points; and
h) cooling the honeycomb to substantially retain the shape of the area of curvature of the mold or form.

Figure 12:
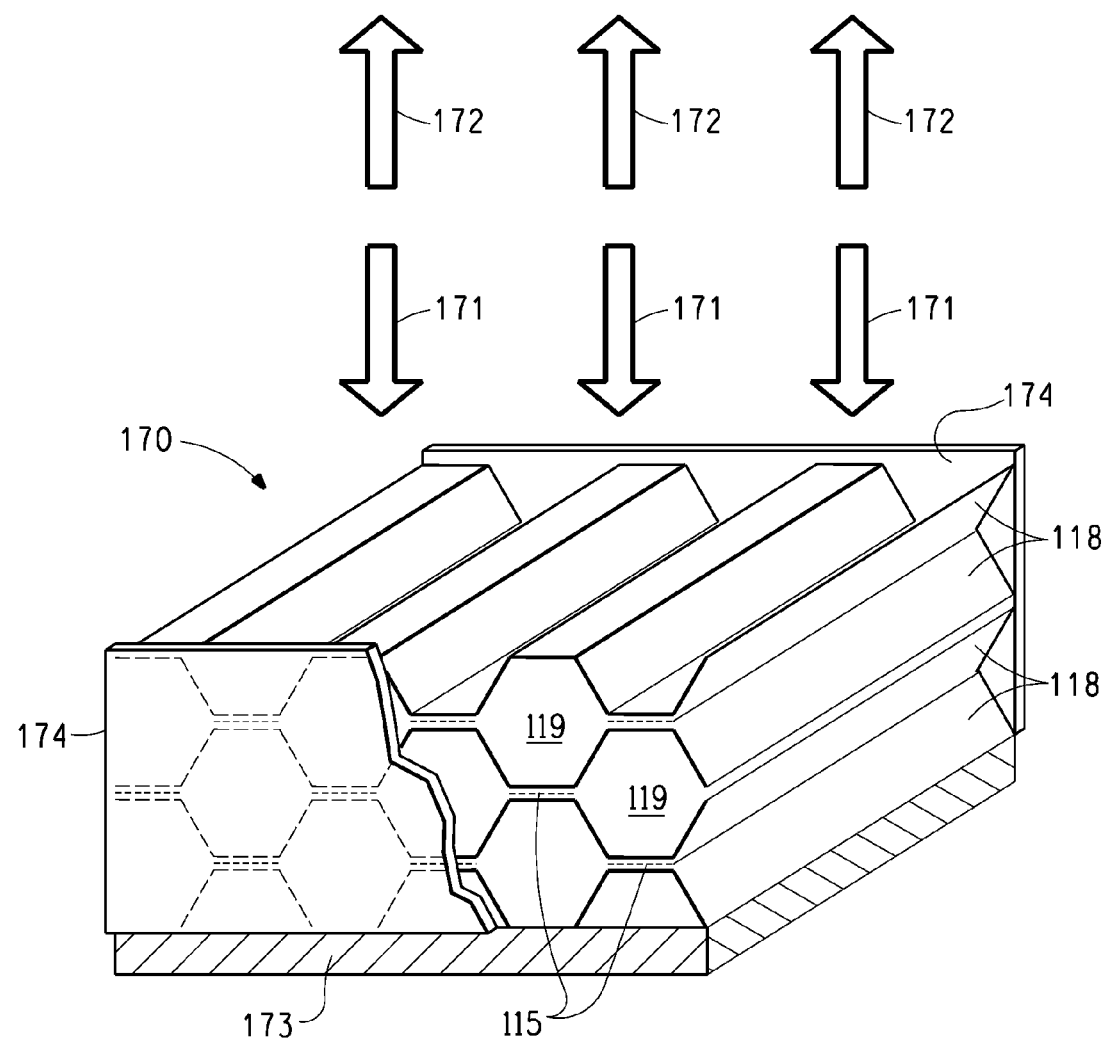
FIG. 12 is a view of a process step for compressing honeycomb to at least partially fracture the thermoset resin.

In this process, a thermoset-resin impregnated honeycomb is first fully or partially cured, however, after curing the honeycomb is then intentionally pressed in a direction perpendicular to a plane of parallel lines of adhesive to fracture at least a portion of the thermoset resin to collapse at least a portion of the cells. As shown in FIG. 12, the expanded honeycomb 170 is pressed in the direction of arrows 171 to compress the cells, generally against a surface 173, to partially or fully fracture at least a portion of the thermoset resin that has been cured in the structure. In many embodiments, this pressing is accomplished while also laterally supporting or restraining the faces of the honeycomb with surfaces 174 to prevent lateral motion of the honeycomb and achieve uniformly directed stress on the core. Once the desired degree of fracture has been accomplished, the honeycomb is then pulled in the direction of arrows 172; that is, in a direction perpendicular to a plane of parallel lines of adhesive, to expand the honeycomb once again and form a honeycomb having fracture points.

The honeycomb is then bent, formed, or molded in a mold or over a form and then heating is applied to the honeycomb to allow the thermoplastic material to flow to the fracture points. The honeycomb is then cooled to substantially retain the shape of the area of curvature of the mold or form. In a similar manner as in the previous processes, the honeycomb can be cut into slices, generally at any step in this process, so that the cellular nature of the honeycomb is preserved. In a preferred embodiment, after the cooling step less than about 25 percent of the honeycomb cells in the area of curvature of the honeycomb have a re-entrant angle of greater than 180 degrees.

Test Methods

Fiber denier is measured using ASTM D1907. Fiber modulus is measured using ASTM D885. Paper density is calculated using the paper thickness as measured by ASTM D374 and the basis weight as measured by ASTM D646. The glass transition temperature (Tg) and melting point temperature (Tm) are measured using ASTM D3418.

EXAMPLE 1

An aramid/thermoplastic paper comprised of Teijin Twaron® 1080 chopped filament fiber, Teijin Twaron® 1094 pulp, and Toray Tetoron® thermoplastic polyester fiber is formed on conventional paper forming equipment. The composition of the paper is 52 weight % Twaron 1080 fiber, 18 weight % Twaron 1094 pulp and 30 weight % Tetoron® fiber. The Twaron 1080 fiber has a nominal filament linear density of 1.5 denier per filament (1.7 dtex per filament) and a 6 mm cut length. The Tetoron® thermoplastic fiber has a nominal filament linear density of 2 denier per filament (2.2 dtex per filament) and a 6 mm cut length. The paper is preheated and prepressed at 245° C. and under 2 MPa pressure It is then calendered under 1200 N/cm of linear pressure at 260° C. This produces an aramid/thermoplastic paper with a density of about 0.75 g/cm3.

A honeycomb is then formed from the calendered paper. Node lines of adhesive are applied to the paper surface at a width of 2 mm and a pitch of 5 mm. The adhesive is a 50% solids solution comprising 70 parts by weight of an epoxy resin identified as Epon 826 sold by Shell Chemical Co.; 30 parts by weight of an elastomer-modified epoxy resin identified as Heloxy WC 8006 sold by Wilmington Chemical Corp, Wilmington, Del., USA; 54 parts by weight of a bisphenol A-formaldehyde resin curing agent identified as UCAR BRWE 5400 sold by Union Carbide Corp.; 0.6 parts by weight of 2-methylimidazole as a curing catalyst, in a glycol ether solvent identified as Dowanol PM sold by The Dow Chemical Company; 7 parts by weight of a polyether resin identified as Eponol 55-B-40 sold by Miller-Stephenson Chemical Co.; and 1.5 parts by weight of fumed silica identified as Cab-O-Sil sold by Cabot Corp. The adhesive is partially cured on the paper in an oven at 130° C. for 6.5 minutes.

The sheet with the adhesive node lines is cut into 500 mm lengths. 40 sheets are stacked one on top of the other, such that each of the sheets is shifted to the other by half a pitch or a half the interval of the applied adhesive node lines. The shift occurs alternately to one side or the other, so that the final stack is uniformly vertical. The number of stacked sheets is then hot-pressed between plates at the softening point of the adhesive, causing the adhesive node lines to melt; once the heat is removed the adhesive then hardens to bond the sheets with each other. For the node line adhesive above, the hot press operates at 140° C. for 30 minutes and then 177° C. for 40 minutes at 3.5 kg per square cm pressure.

The bonded aramid sheets are then expanded in the direction counter to the stacking direction to form cells having an equilateral cross section. Each of the sheets are extended between each other such that the sheets are folded along the edges of the bonded node lines and the portions not bonded are extended in the direction of the tensile force to separate the sheets from each other. A frame is used to expand and hold the honeycomb in the expanded shape.

The expanded honeycomb is then placed in a bath containing PLYOPHEN 23900 solvent-based phenolic resin from the Durez Corporation. The phenolic resin is used in a liquid form wherein the resin is dissolved in ethanol. The resin adheres to and covers the interior surface of the cell walls and can also fill in and penetrate into the pores of the paper. After impregnating with resin, the honeycomb is taken out from the bath and is dried in a drying furnace by hot air first at 82° C. for 15 minutes and then at 121° C. for 15 minutes and then at 182° C. for 60 minutes to remove the solvent and cure the phenolic resin. The frame holding the honeycomb is then removed. The impregnation step in the resin bath and the drying step in the drying furnace are repeated for 5 times so that the cell walls of the honeycomb are coated by and impregnated with a total of 730 grams of the reinforcing resin.

To form the curved honeycomb having a radius of bending of 10 times the core thickness, the honeycomb is soaked in water until dripping wet to plasticize the phenolic matrix. The core is placed in a low thermal mass metal mold with the core cells in direct contact with the mold surface. A spring loaded wire mesh is applied over the top of the core to hold the core in place on the mold. The mold and core are introduced into a hot air convection oven preheated to 270° C. Once the mold reaches 260° C., it is held in the oven for 5 minutes. The mold is removed and forced air cooling is applied for 30 minutes to return the core to ambient temperature. The mold is opened and the shaped core is removed. The core is inspected for collapsed cells with re-entrant angles of greater than 180°. The total count of collapsed cells on any one face in the area of curvature is less than 25 percent of the total number of cells in the area of curvature.

EXAMPLE 2

A paper is made as in Example 1. The paper is printed with adhesive node lines, sheeted, stacked and bonded as in Example 1.

The bonded aramid sheets are then expanded in the direction counter to the stacking direction to form cells having an equilateral cross section. Each of the sheets are extended between each other such that the sheets are folded along the edges of the bonded node lines and the portions not bonded are extended in the direction of the tensile force to separate the sheets from each other. A frame is used to expand and hold the honeycomb in the expanded shape.

The expanded honeycomb is then placed in a bath containing PLYOPHEN 23900 solvent-based phenolic resin from the Durez Corporation. The phenolic resin is used in a liquid form wherein the resin is dissolved in ethanol. The resin adheres to and covers the interior surface of the cell walls and can also fill in and penetrate into the pores of the paper. After impregnating with resin, the honeycomb is taken out from the bath and is dried in a drying furnace by hot air first at 82° C. for 15 minutes and then at 121° C. for 15 minutes to remove the solvent and partially cure or b-stage the phenolic resin. This expanded honeycomb core is more flexible than that in example 1. The frame holding the honeycomb is then removed.

To form the curved honeycomb having a radius of bending of 10 times the core thickness, the core is placed in a low thermal mass metal mold with the core cells in direct contact with the mold surface. A spring loaded wire mesh is applied over the top of the core to hold the core in place on the mold. The mold and core are introduced into a hot air convection oven preheated to 190° C. Once the mold reaches 182° C., it is held in the oven for 60 minutes. The mold is removed and forced air cooling is applied for 30 minutes to return the core to ambient temperature. The mold is opened and the shaped core is removed. The core is inspected for collapsed cells with re-entrant angles of greater than 180°. The total count of collapsed cells on any one face in the area of curvature is less than 25 percent of the total number of cells in the area of curvature.

The invention claimed is:

1. A honeycomb comprising cells having edges forming a face of the honeycomb, the face defined by a plurality of points and having an area of curvature wherein at least two of the points are located in different tangential planes, the cells being expanded paper sheets bonded to each other along a number of node lines of applied adhesive;

the walls of the cells comprising a paper comprising:
  a) 5 to 50 parts by weight thermoplastic material having a melting point of from 120° C. to 350° C., and
  b) 50 to 95 parts by weight of a high modulus fiber having a modulus of 600 grams per denier (550 grams per dtex)

or greater, based on the total amount of thermoplastic material and high modulus fiber in the walls, wherein the high modulus fiber comprises para-aramid polymer, or the high modulus fiber is selected from the group of polybenzazole fiber, polypyridazole fiber, and mixtures thereof;

wherein less than 25 percent of the honeycomb cells in the area of curvature have a re-entrant angle of greater than 180 degrees, and wherein the honeycomb has at least one face under compression and at least one face under tension.

2. The honeycomb of claim 1 wherein the high modulus fiber is present in an amount of from about 60 to 80 parts by weight.

3. The honeycomb of claim 1 wherein the thermoplastic material is present in an amount of from 20 to 40 parts by weight.

4. The honeycomb of claim 1 wherein the para-aramid polymer is poly (paraphenylene terephthalamide).

5. The honeycomb of claim 1 wherein the thermoplastic material comprises polyester polymer.

6. The honeycomb of claim 5 wherein the polyester polymer is a liquid crystalline polymer.

7. The honeycomb of claim 1 wherein the thermoplastic material is selected from the group consisting of polyolefin, polyamide, polyetherketone, polyetheretherketone, polyamide-imide, polyether-imide, polyphenylene sulfide, and mixtures thereof.

8. The honeycomb of claim 1 wherein the thermoplastic material is in the form of a fiber.

9. The honeycomb of claim 1 wherein the thermoplastic material is in the form of a fibrid.

10. The honeycomb of claim 1 wherein the thermoplastic material is in the form of a particle, flake, or powder.

11. The honeycomb of claim 1 further comprising a thermoset matrix resin.

12. An article comprising the honeycomb of claim 1.

13. An aerodynamic structure comprising the honeycomb of claim 1.

14. A panel comprising the honeycomb of claim 1 and a facesheet attached to a face of the honeycomb.

* * * * *